United States Patent
Anderson

(10) Patent No.: US 9,222,248 B2
(45) Date of Patent: Dec. 29, 2015

(54) STORMWATER TREATMENT DEVICE

(71) Applicant: JENSEN ENTERPRISES, INC., Sparks, NV (US)

(72) Inventor: Ronald J. Anderson, Sparks, NV (US)

(73) Assignee: JENSEN ENTERPRISES, INC., Sparks, NV (US)

(*) Notice: Subject to any disclaimer, the term of this patent is extended or adjusted under 35 U.S.C. 154(b) by 330 days.

(21) Appl. No.: 13/800,943

(22) Filed: Mar. 13, 2013

(65) Prior Publication Data

US 2013/0264257 A1 Oct. 10, 2013

Related U.S. Application Data

(60) Provisional application No. 61/616,769, filed on Mar. 28, 2012.

(51) Int. Cl.
*E03F 5/14* (2006.01)
*E03F 5/10* (2006.01)
*E03F 5/04* (2006.01)
*B01D 21/24* (2006.01)

(52) U.S. Cl.
CPC .............. *E03F 5/105* (2013.01); *E03F 5/0403* (2013.01); *E03F 5/14* (2013.01); *B01D 21/2422* (2013.01)

(58) Field of Classification Search
CPC ....... E03F 5/0403; E03F 5/0404; E03F 5/046; E03F 5/105; E03F 5/14; B01D 21/2422; B01D 36/04; B01D 2221/12; C02F 2103/001
USPC ........... 210/163, 164, 170.03, 256, 305, 307, 210/519, 532.1
See application file for complete search history.

(56) References Cited

U.S. PATENT DOCUMENTS

| | | | | |
|---|---|---|---|---|
| 1,070,773 A | * | 8/1913 | Callahan | 210/164 |
| 1,196,880 A | * | 9/1916 | Nickerson | 210/307 |
| 1,793,599 A | * | 2/1931 | Egan | 210/170.03 |
| 2,092,492 A | * | 9/1937 | Akers | 210/170.03 |
| 2,432,203 A | * | 12/1947 | Miller | 210/532.1 |
| 5,788,848 A | | 8/1998 | Blanche et al. | |
| 5,985,157 A | | 11/1999 | Leckner et al. | |
| 6,062,767 A | * | 5/2000 | Kizhnerman et al. | 210/170.03 |
| 6,200,484 B1 | | 3/2001 | McInnis | |

(Continued)

FOREIGN PATENT DOCUMENTS

| JP | 2012-001989 A | 1/2012 |
|---|---|---|
| KR | 2009-0043711 A | 5/2009 |

OTHER PUBLICATIONS

Contech Engineered Solutions, "CDS is the most effective system for the sustainable removal and retention of suspended solids and floatables from storm water" (Brochure), in 1 page. Unknown publication date, believed to be before Jan. 11, 2012.

*Primary Examiner* — Christopher Upton
(74) *Attorney, Agent, or Firm* — Knobbe Martens Olson and Bear LLP

(57) ABSTRACT

A stormwater treatment device has an annular outer portion and an annular inner portion positioned at least partially within the annular outer portion, the annular inner portion offset from the annular outer portion to define a channel between the annular inner portion and the annular outer portion. A flow conduit within the annular inner portion connects to an inlet and has a plurality of openings within the inner portion. The annular outer portion has an outlet connecting to the channel.

9 Claims, 8 Drawing Sheets

(56) References Cited

U.S. PATENT DOCUMENTS

| | | |
|---|---|---|
| 6,315,131 B1 * | 11/2001 | Terrien et al. .................. 210/519 |
| 6,919,033 B2 * | 7/2005 | Stark et al. .................... 210/519 |
| 7,758,747 B2 | 7/2010 | Bryant |
| 2004/0055950 A1 * | 3/2004 | Bryant ....................... 210/532.1 |
| 2010/0108586 A1 | 5/2010 | Qin |
| 2011/0155672 A1 | 6/2011 | McInnis et al. |
| 2011/0233134 A1 * | 9/2011 | Robert .......................... 210/519 |
| 2012/0195686 A1 * | 8/2012 | Hardgrave ..................... 405/52 |

* cited by examiner

STORMWATER TREATMENT DEVICE

CROSS-REFERENCE TO RELATED APPLICATIONS

Any and all applications for which a foreign or domestic priority claim is identified in the Application Data Sheet as filed with the present application, are hereby incorporated by reference under 37 CFR 1.57.

BACKGROUND

1. Field of the Disclosure

The present disclosure relates generally to devices for treatment of stormwater runoff and minimization of pollutant remobilization.

2. Description of the Related Art

Many varieties of stormwater treatment devices exist, providing a variety of functional characteristics. However, such devices and certain components thereof have various limitations and disadvantages.

SUMMARY OF THE DISCLOSURE

A stormwater treatment device, such as a gravity separation stormwater treatment device, is desirably positioned or installed near the site of stormwater runoff from urbanized sites, such as streets, parking lots, sidewalks or other urban locations, and can be used to filter contaminants such as debris or particulate matter from the stormwater runoff. The device can be positioned to receive water directly from a runoff site, from a catch basin or catch basins, or from other devices immediately proximal to a runoff site. A gravity separation stormwater treatment device is not limited to urban sites, however, and can also be used in suburban or rural locations.

A gravity separation device can include a chamber that water enters and exits from an upper end thereof. The device can be configured such that water passes to a lower end of the chamber, such as within a flow conduit in the chamber, and then flows back up to an outlet from the chamber. As the water flows upward, gravity can draw nonbuoyant contaminants to a collection area in the bottom of the chamber. Because a gravity separation stormwater treatment device creates vertical flows of water, rather than filtering laterally flowing water, it can have a smaller footprint than other types of stormwater treatment or water filtration devices. A small footprint can lead to an increased diversity of locations in which the treatment device can be positioned or installed.

In various embodiments, a gravity separation stormwater treatment device can have a variety of other features that improve the flexibility of the treatment device to be positioned in diverse locations. For example, in some embodiments a treatment device can be configured to have inlets and outlets at varying geometries relative to each other and at varying heights relative to each other. In some embodiments, a treatment device can be modified according to the hydraulic function constraints of an installation location without needing to modify the treatment function or capabilities of the treatment device.

In various embodiments, a stormwater treatment vault for receiving water from a surface draining area can include a cylindrical outer portion having an outer wall that defines a vault chamber, a cylindrical inner portion at least partially within the vault chamber, the inner portion having a base and an inner wall that defines an inner chamber and a circumferential channel between the inner wall and the outer wall. The vault can also include a flow conduit within the inner chamber, the flow conduit having a plurality of openings positioned below an upper end of the inner wall, an inlet connecting to an upper half of the flow conduit, and an outlet from the circumferential channel. The flow conduit can be configured such that water entering the inlet will descend into the flow conduit and into the inner chamber, filter through the plurality of openings, rise upward to flow over the inner wall and into the circumferential channel, and pass through the outlet. In some embodiments, the outlet can be generally level with the inlet. In some embodiments, a plurality of openings can extend through the inner wall. In some embodiments the openings can be generally level with the outlet or generally level with the inlet.

In some embodiments, a stormwater treatment vault can include a hydraulic deflection disc positioned concentrically around the flow conduit below the plurality of openings. In some embodiments, a gap can exist between the plurality of openings and the base of the inner portion. In some embodiments the gap can be between the hydraulic deflection disc and the base of the inner portion.

In some embodiments, a v-notch weir can attach to the upper end of the inner wall. In some embodiments, a curb can be offset from and attached to the inner wall, the curb substantially parallel to the inner wall and having a top end above the upper end of the inner wall and a bottom end below the upper end of the inner wall.

In some embodiments, a stormwater treatment vault can include a bypass conduit fluidly connecting the vault chamber above the circumferential channel to an outlet pipe connected to the outlet. In some embodiments, a removable filtration basket can be positioned within the flow conduit. In some embodiments, the flow conduit can be a pipe. In some embodiments, the inlet can be configured to connect to an inlet pipe.

In various embodiments, a stormwater treatment vault for receiving water from a surface draining area can include a base comprising a bottom and a base cylindrical wall with a top opening, an outer housing comprising a top and a housing cylindrical wall with a bottom opening, wherein the base cylindrical wall is configured to be positioned through the bottom opening of the outer housing and at least partially within the outer housing, the base cylindrical wall offset from the housing cylindrical wall to define a channel. The stormwater treatment vault can also include an inlet at an upper portion of the outer housing, an outlet in the housing cylindrical wall, and a fluid duct configured to be positioned within the base and connected to the inlet, the fluid duct having a plurality of holes positioned below the inlet. The fluid duct can be configured such that water entering the inlet will enter the fluid duct and descend into the base, move through the plurality of holes, rise upward to pass over an upper surface of the base cylindrical wall and into the channel, and then pass into the outlet.

In some embodiments, the fluid duct can be a pipe. In some embodiments, a removable well screen can be positioned within the fluid duct. In some embodiments, a curb can attach to the base in a position offset from the base. In some embodiments, a flange can be positioned around the flow conduit below the plurality of openings. In some embodiments, the flange and the bottom of the base can form a space or gap between them.

In some embodiments, the outlet can be below the inlet. In some embodiments, the base cylindrical wall can have a plurality of openings extending therethrough. In some embodiments, a bypass channel can fluidly connect an interior of the outer housing to an outlet pipe connected to the outlet.

In some embodiments, a stormwater treatment vault for receiving water from a surface draining area can include an outer portion with an annular outer wall; an inner portion at least partially within the annular outer wall and having a base and an annular inner wall that defines an inner chamber; a channel between the inner wall and the outer wall; and a flow conduit within the inner chamber that has at least one opening below an upper edge of the inner wall. In some embodiments, an inlet can connect to the flow conduit and an outlet can connect to a bottom of the channel. The flow conduit can be configured such that water entering the inlet will descend into the flow conduit and into the inner chamber, filter through the at least one opening, flow up and over the inner wall into the channel, and pass through the outlet.

In some embodiments, the inner portion can define a hydraulic treatment depth. In some embodiments, the outer portion can define a hydraulic flow path. In some embodiments, the outer portion can define a vertical and a horizontal component of the hydraulic flow path. In some embodiments, the outer portion can define a vertical component of the hydraulic flow path.

In some embodiments, the outer portion can define at least two non-perpendicular orientations for an outlet. In some embodiments, the outer chamber can define at least three orientations for an outlet. In some embodiments, the annular outer wall and the annular inner wall can be cylindrical.

DETAILED DESCRIPTION OF THE PREFERRED EMBODIMENT

Figure 1:
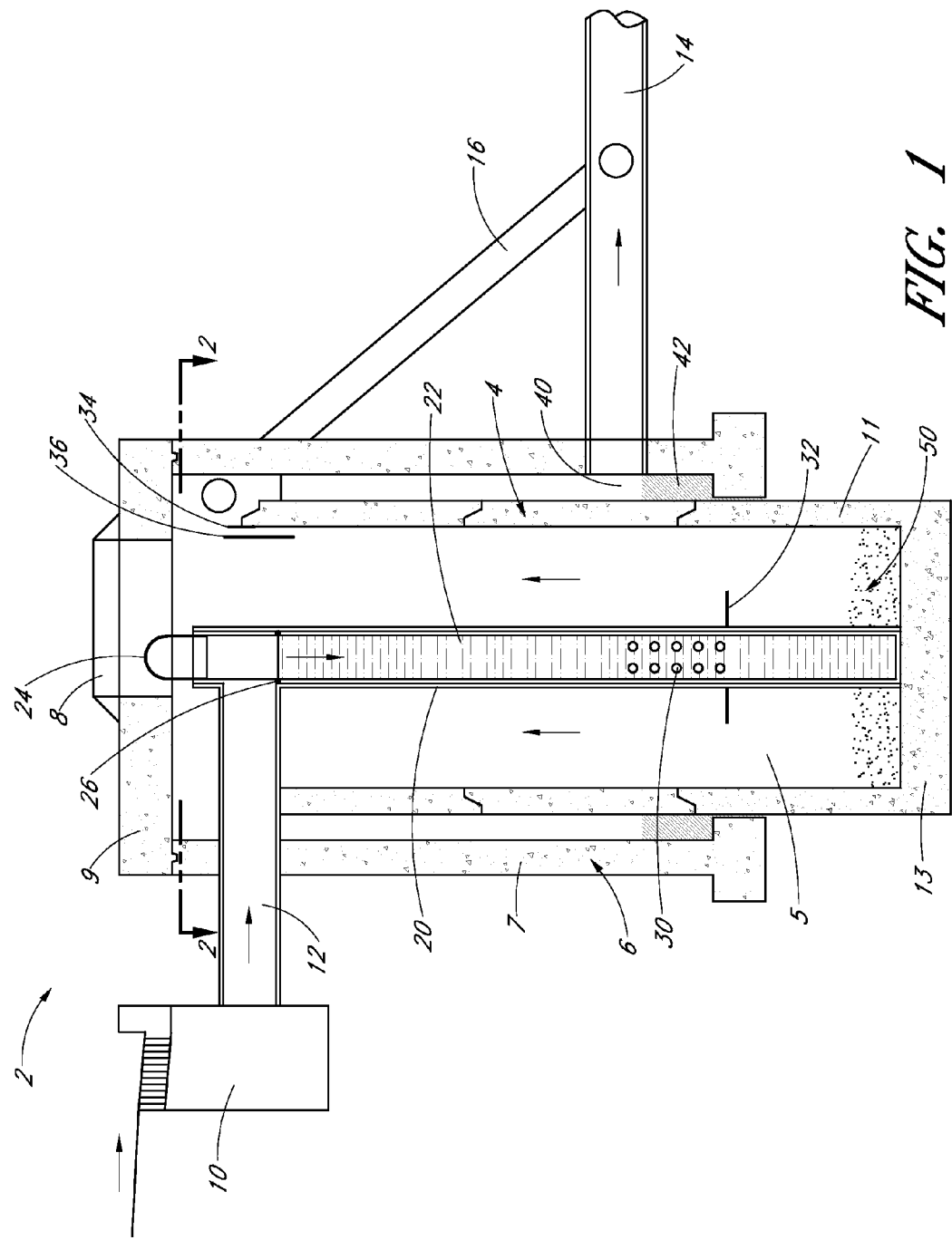
FIG. 1 is a cross sectional side view of one embodiment of a stormwater treatment device.
Figure 2:
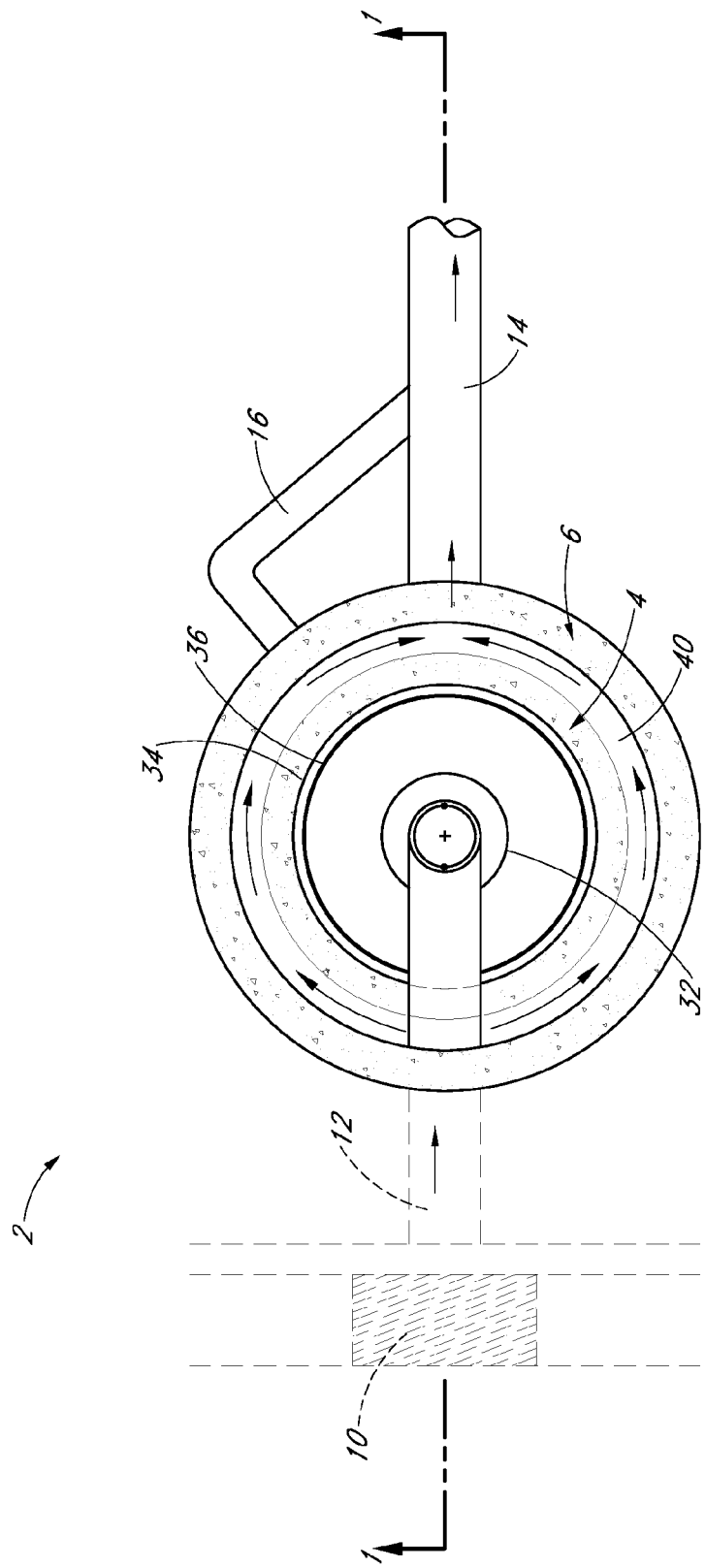
FIG. 2 is a top cross-sectional view of the stormwater treatment device of FIG. 1.

FIGS. 1 and 2 illustrate one embodiment of a gravity separation stormwater treatment device 2. FIG. 1 illustrates a front cross-sectional view of the device and FIG. 2 illustrates a top cross-sectional view taken along the line 2-2 of FIG. 1.

A gravity separation stormwater treatment device 2 desirably comprises a base portion 4 and a top portion 6. The base portion can include a bottom 13 and an inner or side wall or walls 11 that define a main chamber 5. The base portion is desirably open on top. The top portion can have a top 9 and an outer or side wall or walls 7. The top portion is desirably open on its bottom. The base portion and top portion are desirably positioned such that the top portion at least partially overlaps the base portion, as illustrated in FIG. 1, defining a channel 40 between the top portion and the base portion. A sealing agent 42 can be used to seal the channel at a bottom end thereof.

The base and top portion are desirably cylindrical, although in some embodiments the base portion and/or top portion can be annular with a variety of other cross-sections, such as square, rectangular, hexagonal, octagonal, or other shapes. The base portion and top portion are desirably formed of a precast concrete, although in some embodiments they can comprise metal or other material.

In some embodiments, the treatment device 2 can include a removable access cover 8 that can attach to the top 9. The access cover is desirably a metallic material, such as cast iron or steel. The cover is desirably circular, although it can have any shape.

The treatment device can connect to an inlet, such as inlet pipe 12, and to an outlet, such as outlet pipe 14. The inlet pipe desirably receives flow from a catch basin 10 or other device adjacent an urban site. From the inlet pipe, water desirably flows to a flow conduit 20, such as a casing pipe, desirably positioned vertically within the base portion 4 of the treatment device, although in some embodiments it can have different orientations. The casing pipe can be made of concrete, PVC plastic or other material. The casing pipe 20 desirably has a plurality of openings, such as holes 30, along a lower end of the pipe. Water entering the inlet pipe will desirably fall into the casing pipe, passing through openings 30 to a main chamber 5 of the stormwater treatment device. The openings are desirably positioned a distance above the bottom 13 of the base portion 4.

In some embodiments, a filtration basket or well screen 22 can be positioned within the casing pipe. The well screen desirably has a mesh or otherwise porous surface that allows water to pass through. Any contaminants that do not fit within the porous surface of the well screen will be caught and remain within the well screen. The well screen can be seated with a gasket 26 to help ensure that all water entering the casing pipe 20 enters the well screen 22.

In some embodiments, the well screen can comprise a handle 24 along a top end of the well screen. The cover 8 is desirably positioned such that when it is removed from the top 9, the handle 24 is easily accessible. The well screen can be maintained by simply lifting it out of the casing pipe 20 and removing any contaminants that have accumulated within.

After water flows through the openings 30 of the casing pipe 20 and into the chamber 5, it will tend to drift upwards towards an upper end of the inner wall 11. It can then pass over the inner wall and into the channel 40. Some contaminants may be too small to have been caught within the well screen 22, and as the water moves upward in the chamber 5 settable solid particles remaining in the water that have a specific gravity greater than water will desirably descend and collect along the sediment retention area 50. Insoluble droplets and materials and marginally buoyant debris will tend to float to the surface.

In some embodiments, the gravity separation stormwater treatment device can also comprise a hydraulic deflector 32, which is desirably positioned around the circumference of the casing pipe 20. The hydraulic deflector can have different shapes but is desirably a disc positioned concentrically around the casing pipe. In some embodiments the deflector can be curved or angled vertically. The deflector is desirably positioned at a vertical position at least slightly below the lowest of the plurality of holes 30 and a distance above the bottom 13 of the base portion 4. The hydraulic deflector desirably directs water that exits the casing pipe 20. This can help prevent a downward current and thereby limit or prevent the formation of eddies that could re-suspend contaminants collected in the retention area 50.

In some embodiments, the stormwater treatment device can include a weir 34 attached to an interior surface of an upper end of the inner wall 11. In some embodiments, a weir 34 can have notches, such as with a v-notch weir. The weir desirably extends above the inner wall such that water spills directly over the weir to enter the channel 40. In some embodiments, the device can comprise an offset curb 36 positioned generally parallel to the inner wall and between the inner wall and the casing pipe 20. The offset curb desirably has an upper end above the top of the weir 34 or inner wall 11 and a bottom end below the top of the inner wall. The offset curb can be positioned at differing distances from the weir or inner wall. The offset curb can act as a final filter for contaminants, because water that spills over the weir into the outer channel 40 will desirably pass through the gap between the offset curb 36 and the weir 34 or inner wall 11. Much of the buoyant contaminants or debris that pass through to the chamber 5 will desirably remain floating between the curb 36 and the casing pipe 20, unable to sink to be able to pass between the curb and the weir. Further, in embodiments where the weir has notches along its top surface, some of the contaminants or debris which might flow over the weir can be blocked and caught by the notches.

In some embodiments, the weir and the curb can comprise plates of metal, plastic, or other material that are attached to the inner wall 11. In some embodiments, the device can comprise only an offset curb 36, and water can spill directly over the inner wall 11. Because water will flow over the weir 34 or inner wall 11 and into the outer channel 40, the water level within the base portion 4 is generally controlled by the height of the weir or inner wall. As can be seen in FIG. 2, the weir 34, offset curb 36, and channel 40 desirably extend around the full circumference of the base portion 4. From the channel 40, water can collect and flow through the outlet pipe 14. The outlet pipe desirably connects to a bottom of the channel 40.

In some embodiments, a stormwater treatment device 2 can comprise a bypass option, such as a bypass pipe 16, which can allow water to flow through the device without flowing down into the casing pipe 20 and through the openings 30 in the casing pipe. This can be advantageous if the device is not maintained with sufficient regularity or if a large flow event occurs. By allowing water to skip the flow path through the openings 30 and then back up within the main chamber 5, undesired flushing of accumulated contaminants can be minimized. The bypass pipe 16 desirably connects to the device at or above the top of the channel 40. In some embodiments, the bypass pipe can connect directly to the casing pipe 20, desirably at or above approximately the same level as the inlet pipe 12. If the flow rate is too great, or if there is too much accumulated debris for water to be able to flow from the inlet pipe down into the casing pipe, water can flow instead into the bypass 16. At an opposite end, the bypass pipe 16 can connect to the outlet pipe 14.

One advantage of the gravity separation stormwater treatment device is that, because it does not depend on lateral water flow, it can be modified to increase the volume of water that it can contain by increasing the length of the inner wall 11 to make the base deeper, which does not affect the footprint of the device. A deeper base can improve treatment of the water by increasing the distance that water must travel to exit the base portion. Further, by increasing the depth of the base portion 4, the device can retain more contaminants without having to be cleaned or maintained. Cleaning the device is a generally simple process, however. For example, in some embodiments cleaning the device can involve removing the cover 8 and lifting the filtration basket or well screen 22 from the casing pipe 20 to remove debris caught in the well screen. With the cover removed, it is also possible to remove any sediment that has collected in the sediment retention area 50 and/or skim off contaminants that may have accumulated on the surface of the water, such as against a weir 34 or between the offset curb 26 and the casing pipe.

Additionally, the height of the outer wall 7 can be modified to adjust vertical positioning of the connection to an outlet pipe 14. This allows a treatment device 2 to be modified, such as by modifying the height of the outlet pipe relative to the inlet pipe, to satisfy different hydraulic function constraints without affecting the size of the main chamber 5, the footprint of the device, or its treatment capabilities generally.

Figure 3:
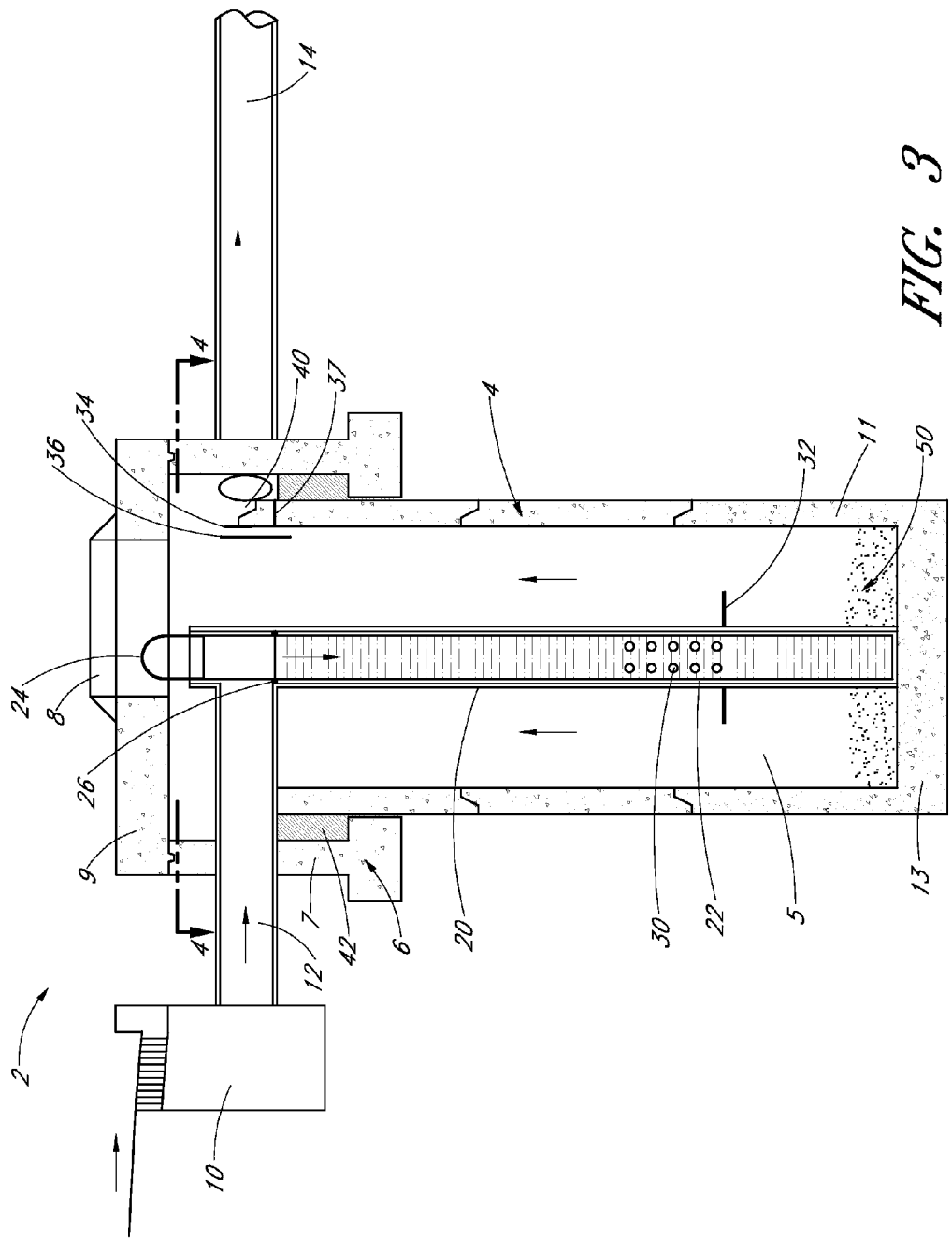
FIG. 3 is a cross sectional side view of one embodiment of a stormwater treatment device.

FIG. 3 illustrates one embodiment of a gravity separation stormwater treatment device 2 in which the outer wall 7 has been shortened such that an outlet pipe 14 can be substantially level with or slightly below an inlet pipe 12. This can be desirable, for example, in situations in which the device is retrofitted into an existing storm drain. In some embodiments, rather than varying the size of the outer wall 7, the size of the channel 40 can be modified by adjusting the amount of sealing material 42 within the channel 40, such that, an outlet pipe connection to the bottom of the channel varies in vertical position.

In some embodiments, the inner wall 11 can comprise radial openings 37. In some embodiments, radial openings 37 can be positioned approximately level with a bottom of the inlet pipe 12 and can help ensure that the inlet pipe drains after a storm event. The radial openings are also visible in FIG. 4, which shows a top cross-sectional view of the device of FIG. 3.

Figure 4:
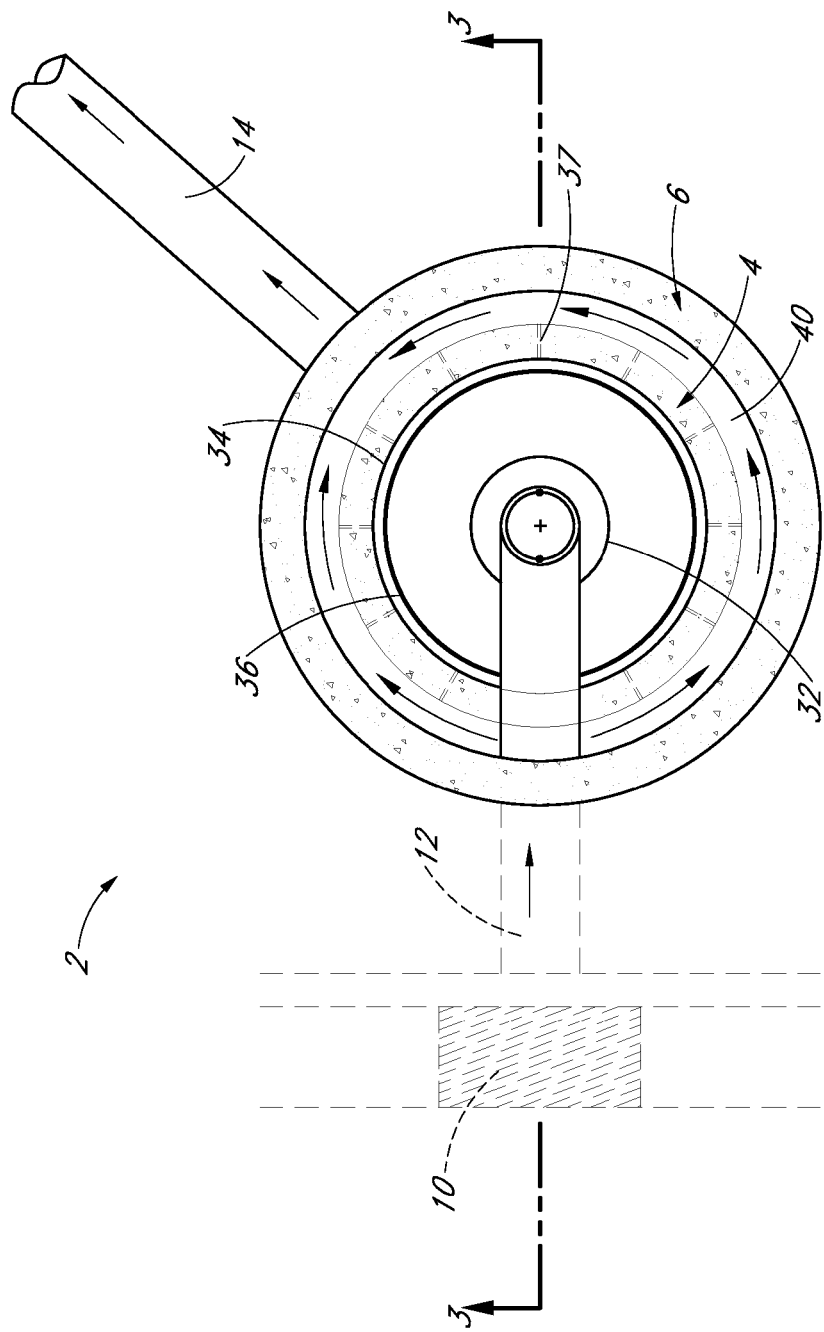
FIG. 4 is a top cross-sectional view of the stormwater treatment device of FIG. 3.
Figure 5:
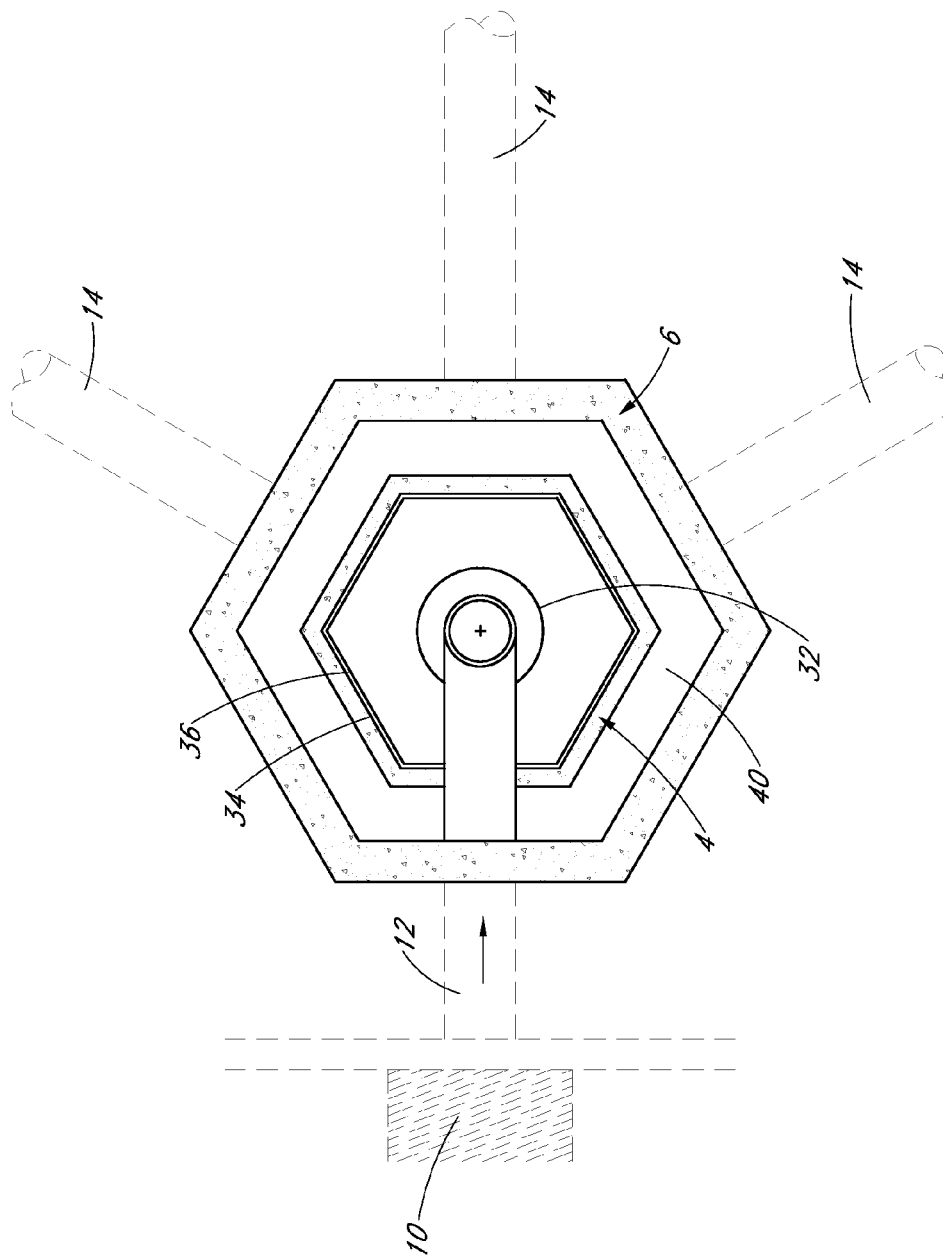
FIG. 5 is a top cross-sectional view of one embodiment of a stormwater treatment device.

A stormwater treatment device can comprise variable inlet/outlet pipe geometry. In some embodiments, outlet pipe 14 can be configured so that water exits the device in substantially the same direction in which it entered the device. In other embodiments, depending on the installation location and the needs of the installer and piping system, the outlet pipe 14 can be positioned at varying angles relative to the inlet pipe 12. FIG. 4 illustrates one such embodiment. FIG. 5, which is a top cross-sectional view of one embodiment of a gravity separation stormwater treatment device, also illustrates an outlet pipe 14 that can be positioned at varying angles. FIG. 5 illustrates three possible positions of an outlet pipe depending on how the top portion 6 is configured to align with the bottom portion 4. Other outlet pipe alignments and positions are possible.

In some embodiments, a top portion 6 can be formed with multiple holes in the outer wall 7 for an outlet pipe, and varying the angle of the outlet pipe can be done by selecting a desired hole. Remaining holes can be plugged. In some embodiments, a top portion can be formed with no outlet holes, and varying the angle of the outlet pipe can be done by forming a hole in the outer wall at a desired angle for the outlet pipe.

FIG. 5 also illustrates an embodiment of a gravity separation stormwater treatment device that has a non-circular annular shape. As illustrated, in some embodiments a stormwater treatment device can have a top portion 6 and a base portion 4 that can have a hexagonal cross-section. As discussed above, other cross sections are considered. In some embodiments, the top portion can have a different cross sectional shape from the base portion.

The flexibility of the various embodiments of a stormwater treatment device described herein allows the device to help satisfy hydraulic functional requirements in addition to treatment requirements. For example, FIGS. 6-8 illustrate different possible placements of a gravity separation stormwater treatment device that satisfy hydraulic functional requirements, such as requirements dictated by external constraints, while still satisfying treatment requirements.

Figure 6:
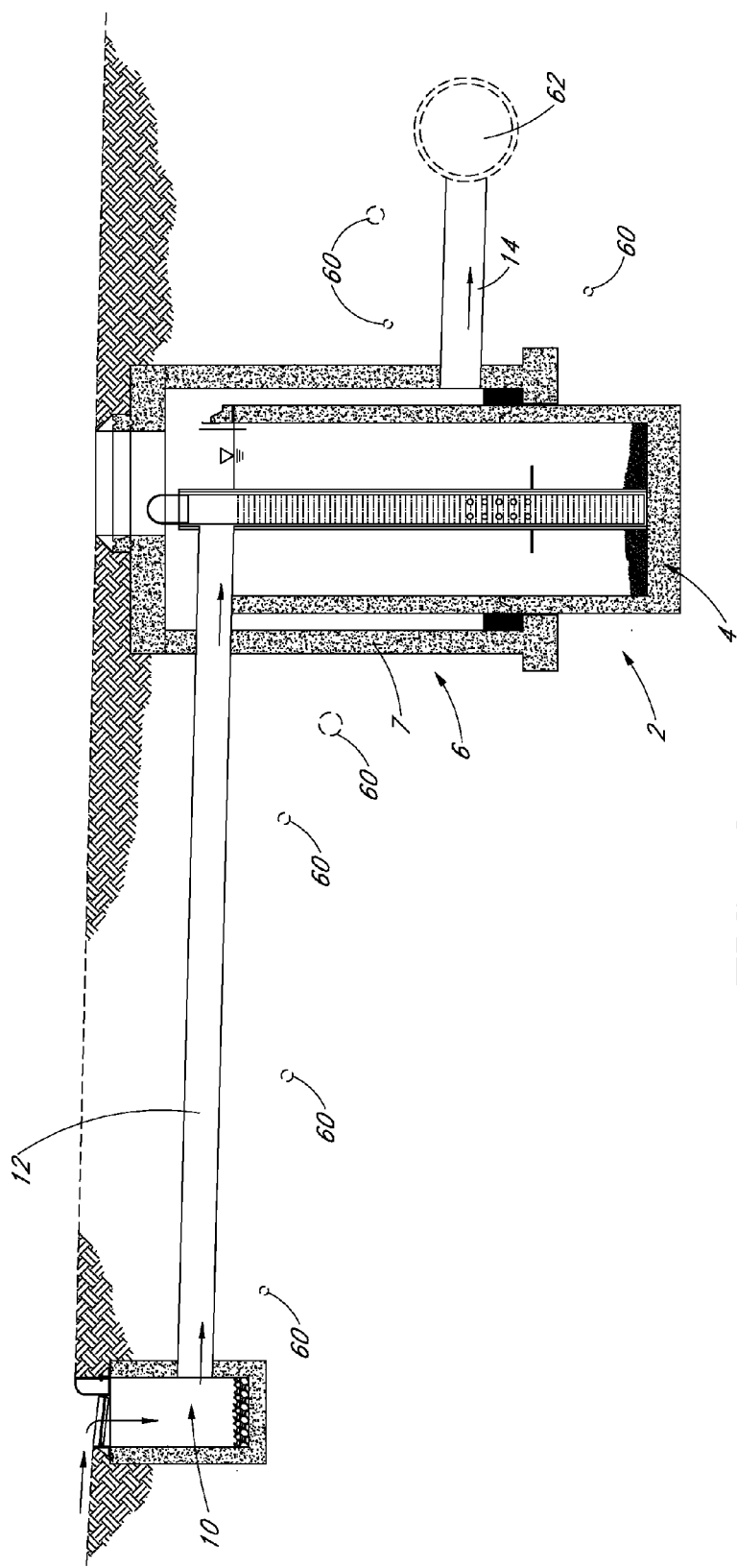
FIG. 6 is a schematic view of a stormwater treatment device positioned between utility lines.

FIG. 6 illustrates a stormwater treatment device 2 that is positioned a distance away from a catch basin 10 in order to avoid various utility lines 60, such as electric lines, gas lines, water lines, etc. Similarly, the outer wall 7 can be sized to allow an outlet pipe 14 to connect to a storm drain that is positioned according to constraints dictated by utility lines. The base portion 4 can be independently sized, as described above, in order to maintain a desired depth to maximize treatment conditions and/or storage capacity of the stormwater treatment device.

Figure 7:
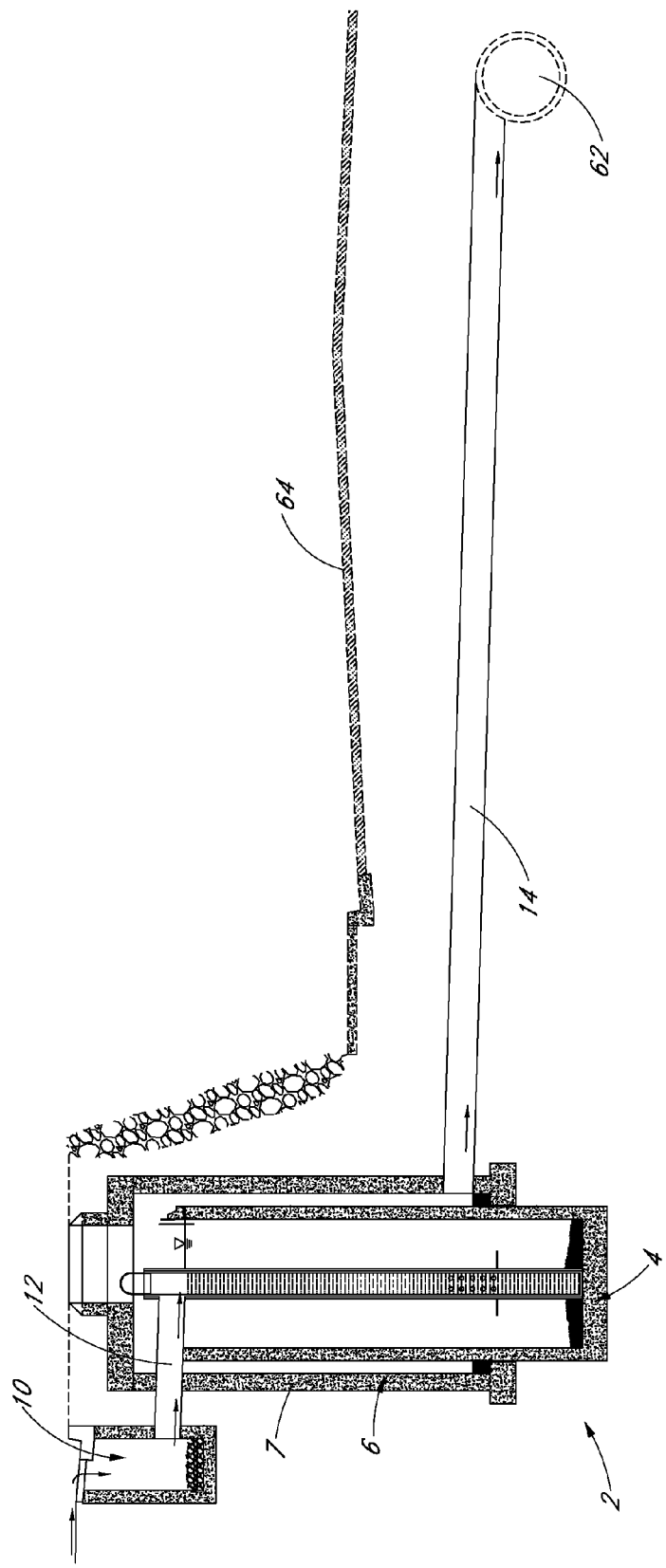
FIG. 7 is a schematic view of a stormwater treatment device connecting to a storm drain beneath a road.
Figure 8:
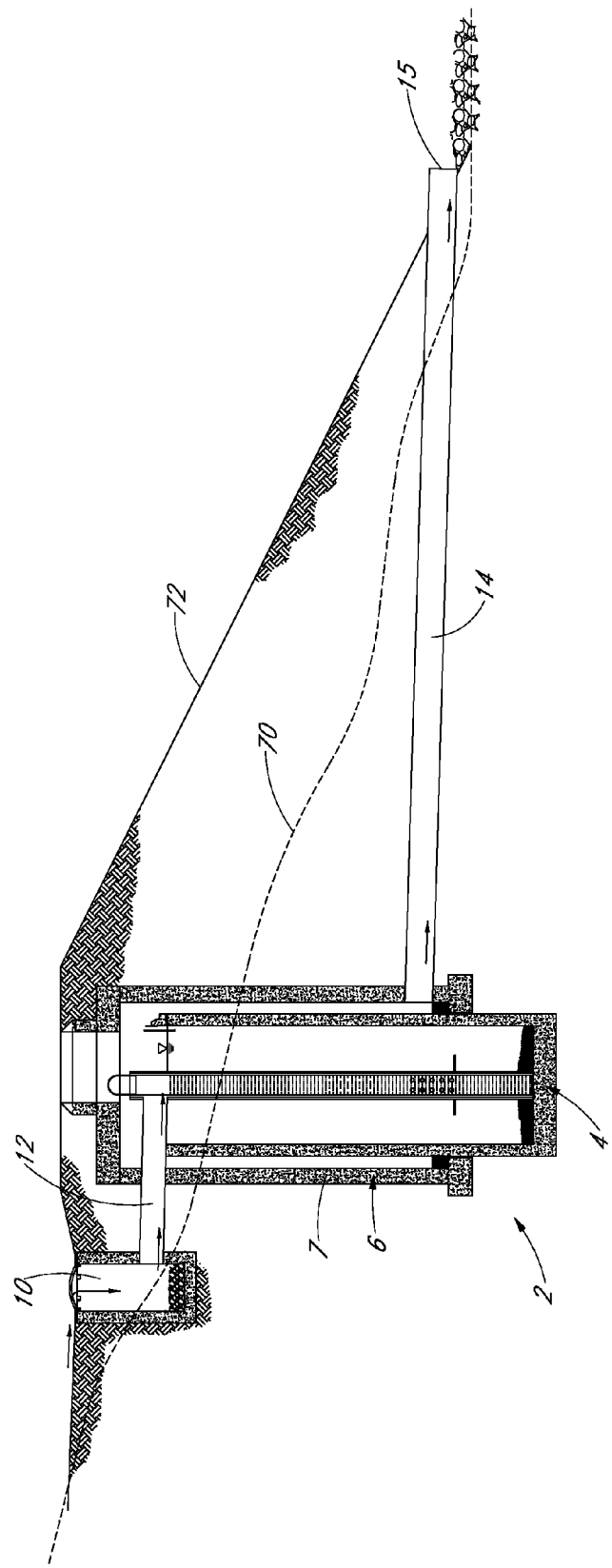
FIG. 8 is a schematic view of a stormwater treatment device adapted to a position to minimize erosion.

FIG. 7 illustrates an example where the position of the outlet pipe 14 is constrained by a street 64 below a catch basin 10. The inlet pipe 12 can still flow into the device 2 at a desired angle and the outlet pipe 14 can exit sufficiently far enough down to pass beneath the street to reach the existing storm drain 62. FIG. 8 illustrates an example where an outlet pipe 14 is preferably positioned to minimize erosion following landscaping. In FIG. 7 the outlet pipe runs through soil beneath an original ground level 70 such that fluid in the outlet pipe 14 can pass through an exit 15 below the landscaped slope 72. Various other arrangements and positions of the stormwater treatment device are possible to satisfy hydraulic functional requirements without affecting its water treatment functionality.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

Similarly, this method of disclosure is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A stormwater treatment vault for receiving water from a surface draining area, the vault comprising:
   a base comprising a bottom and a base cylindrical wall with a top opening;
   an outer housing comprising a top and a housing cylindrical wall with a bottom opening, the base cylindrical wall configured to be positioned through the bottom opening of the outer housing and at least partially within the outer housing, the base cylindrical wall offset from the housing cylindrical wall to define a channel;
   an inlet at an upper portion of the outer housing;
   an outlet in the housing cylindrical wall; and
   a fluid duct configured to be positioned within the base and connected to the inlet, the fluid duct comprising a plurality of holes positioned below the inlet;
   wherein the fluid duct is configured such that water entering the inlet will enter the fluid duct and descend into the base, move through the plurality of holes, rise upward to pass over an upper surface of the base cylindrical wall and into the channel, and then pass into the outlet.

2. The stormwater treatment vault of claim 1, wherein the fluid duct is a pipe.

3. The stormwater treatment vault of claim 1, further comprising a curb offset from and attached to the base.

4. The stormwater treatment vault of claim 1, further comprising a flange positioned around the flow conduit below the plurality of openings.

5. The stormwater treatment vault of claim 4, further comprising a gap between the flange and the bottom of the base.

6. The stormwater treatment vault of claim 1, further comprising a removable well screen positioned within the fluid duct.

7. The stormwater treatment vault of claim 1, wherein the outlet is below the inlet.

8. The stormwater treatment vault of claim 1, wherein the base cylindrical wall comprises a plurality of openings extending through the base cylindrical wall.

9. The stormwater treatment vault of claim 1, further comprising a bypass channel fluidly connecting an interior of the outer housing to an outlet pipe connected to the outlet.

* * * * *